UNITED STATES PATENT OFFICE.

FRITZ FUNCKE, OF BASEL, SWITZERLAND, ASSIGNOR TO THE FIRM OF SOCIETY OF CHEMICAL INDUSTRY IN BASLE, OF BASEL, SWITZERLAND.

RED TRIPHENYLMETHANE DYE AND PROCESS OF MAKING.

No. 887,620.  Specification of Letters Patent.  Patented May 12, 1908.

Application filed October 24, 1907. Serial No. 399,038.

*To all whom it may concern:*

Be it known that I, FRITZ FUNCKE, chemist and doctor of philosophy, a subject of the Emperor of Austria-Hungary, and resident of Basel, Switzerland, have invented a new and useful Red Triphenylmethane Dyestuff and a Process of Making Same, of which the following is a full, clear, and exact specification.

I have found, that by condensing 1 mol. of orthochlorobenzaldehyde with 2 mol. of ortho-cresotinic acid a monochlorophenyl-dioxyditolylmethandicarboxylic acid is obtained, which can be transformed by its treatment with suitable oxidizing agents into a new triphenylmethane dyestuff dyeing wool in an acid bath pale red tints turning to a vivid greenish blue of excellent fastness by their subsequent treatment on the fiber with chromium compounds.

The following example illustrates the manufacture of this new dyestuff. 14 parts of orthochlorobenzaldehyde and 30 parts of orthocresotinic acid are poured into 300 parts of sulfuric acid of 80 to 90 per cent. $H_2SO_4$ and the mixture is heated on a water bath until the condensation is effected, that is to say during about 10 hours. The mass is then cooled down and poured into water and the precipitated leucobody is separated by filtration, pressed and dried. For its transformation into the dyestuff 43 parts of the thus obtained leucobody are introduced into a solution of 6.9 parts of sodium nitrite in 150 parts concentrated sulfuric acid at a temperature not exceeding 25° C., and the mixture is maintained at this temperature, while stirring, during about 24 hours. The mass is then poured into water and the precipitated dyestuff is separated by filtration in the form of a red powder, washed with water and again dissolved in a dilute solution of sodium carbonate. From the filtered solution the sodium salt of the dyestuff is precipitated by an addition of common salt. In a dry state, it constitutes a yellowish brown powder dissolving in water with yellowish red coloration turning to bluish-violet on addition of soda lye. It is soluble in concentrated sulfuric acid to a reddish-orange solution from which the free dyestuff-acid precipitates on addition of ice water, in the form of red flocks. The alcohol dissolves it with some difficulty with a yellow coloration. The free dyestuff-acid is also soluble in ether and chloroform. It dyes wool in an acid bath red pale tints becoming vivid greenish-blue by their subsequent treatment with chromium compounds. When printed on cotton with chromium acetate the dyestuff produces also pure greenish blue tints. The chromated dyeings on wool as well as the printed patterns on cotton offer an excellent fastness to washing and a good fastness to chlorin.

In the foregoing example the sodium nitrite may be replaced by other oxidizing agents, as for instance a persulfate. The oxidation can further be effected directly after the condensation, without previous separation of the leucocompound, by adding the oxidizing agent to the sulfuric mixture resulting from the condensation.

What I claim is:

1. The described process for the manufacture of a red triphenylmethane dyestuff, by first condensing one molecule of orthochlorobenzaldehyde with two molecules of orthocresotinic acid and then treating the resulting leucocompound with a suitable oxidizing agent.

2. The described process for the manufacture of a red triphenylmethane-dyestuff by first condensing one molecule of orthochlorobenzaldehyde with two molecules of orthocresotinic acid in presence of sulfuric acid and oxidizing the so obtained leucocompound by means of nitrous acid, in presence of concentrated sulfuric acid as solvent.

3. As a new article of manufacture the hereindescribed red triphenylmethane dyestuff, constituting a red powder, soluble in pure water with yellowish red color, which on addition of caustic soda lye turns to bluish-violet, soluble in concentrated sulfuric acid to a reddish orange colored solution, from which on addition of ice-water the free dyestuff acid is precipitated in the form of red flocks, soluble in ether, alcohol and chloroform with reddish yellow to orange color and dyeing unmordanted wool in an acid bath red shades which on treatment with chromium compounds turn to a vivid greenish blue, fast to washing and chlorin.

In witness whereof I have hereunto signed my name this 12 day of October 1907, in the presence of two subscribing witnesses.

FRITZ FUNCKE.

Witnesses:
 GEO. GIFFORD,
 AMAND BRAUN.